June 20, 1933.  F. E. KEY  1,914,512
TUBE CONNECTING DEVICE
Filed Nov. 27, 1931  2 Sheets-Sheet 1

INVENTOR:
FREDERICK E. KEY.
BY Bakewell & Church
ATTORNEYS

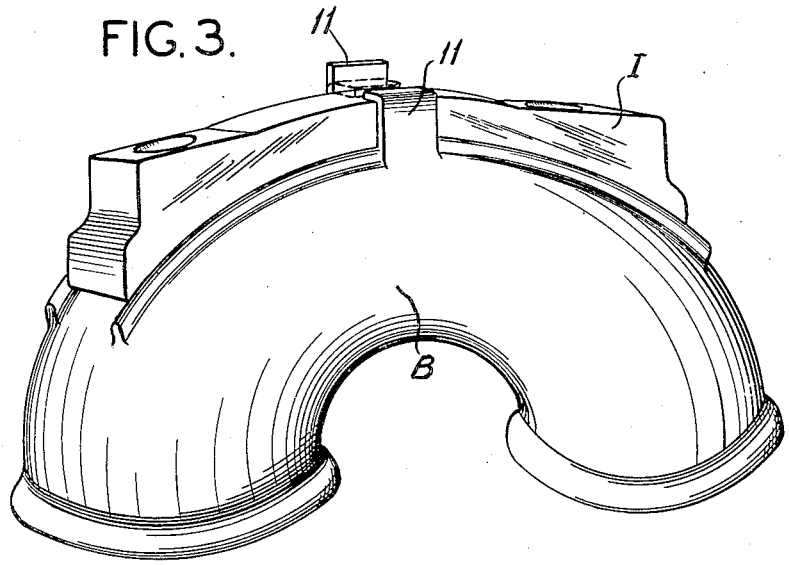

Patented June 20, 1933

1,914,512

UNITED STATES PATENT OFFICE

FREDERICK E. KEY, OF ST. LOUIS, MISSOURI, ASSIGNOR TO KEY BOILER EQUIPMENT COMPANY, OF EAST ST. LOUIS, ILLINOIS, A CORPORATION OF MISSOURI

TUBE CONNECTING DEVICE

Application filed November 27, 1931. Serial No. 577,530.

This invention relates to devices of the kind that are used in oil cracking stills and other tubular structures for connecting or joining two tubes, and particularly, tube connecting devices of the type that comprise a removable tubular element for establishing communication between the tubes, a housing mounted on the tubes, and a retaining means for said tubular element carried by said housing and adapted to be manipulated or adjusted so as to force said tubular element towards the ends of the tubes.

The main object of my present invention is to provide a tube connecting device of the general type mentioned, which is of such design or construction that binding screws which are used to exert a thrust on the tubular element, will be maintained in direct longitudinal alignment with the tubes, even though the ends of the tubes are slightly offset or arranged so that one tube projects slightly beyond the other, and even though there are slight inequalities in the size or machining of the opposed co-acting surfaces of the structure which are intended to contact or bear upon each other.

Another object is to provide a tube connecting device of the general type mentioned, in which the contacting surfaces on the removable tubular element and the seats on which said element bears, are of the ball and socket type, and the contacting surfaces between said tubular element and the retaining means for said element are of such design that said tubular element is capable of assuming various positions relatively to said retaining means without impairing or reducing the efficiency of said retaining means.

And still another object of my invention is to provide a tube connecting device of the general type mentioned, in which the retaining means for the removable tubular element comprises a saddle with which said tubular element is slidingly engaged or combined in such a way that said element is capable of assuming various positions in adapting itself to the tube ends or surfaces on which it is seated, without altering or destroying the longitudinal alignment between the tubes and binding screws that are used to retain said tubular element in operative position.

Figure 1 of the drawings is a side elevational view, partly broken away, of a tube connecting device embodying my present invention.

Figure 3 is a perspective view, showing a saddle of slightly different form combined with the removable tubular element, so as to form a unit that can be removed without liability of the saddle dropping off the tubular element.

Figure 1:
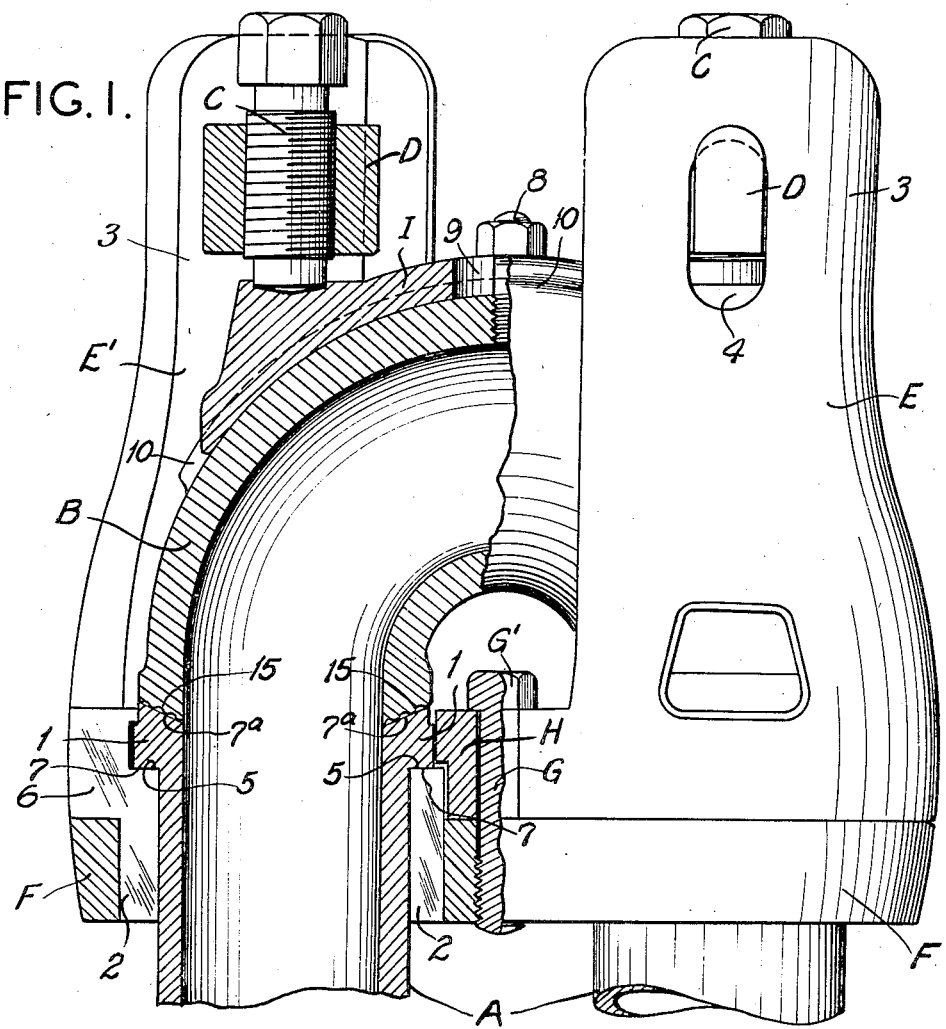

In the accompanying drawings which illustrate the preferred form of my invention, A designates two tubes arranged in parallel relationship and provided with flanged or upset ends 1, and B designates a removable tubular element that establishes communication between said tubes. The tubular element B is held in operative position by a retaining means that comprises binding screws C mounted in supporting members D, which, in turn, are supported or held by a housing that is mounted on the tubes A. In the form of my invention herein illustrated the housing just referred to is composed of two main parts or shackles E and E' that are combined in such a manner that they are capable of moving endwise or longitudinally relatively to each other sufficiently to compensate for slight variations or inaccuracies in the position of the tube ends or in the size or machining of the opposed surfaces of the structure which are intended to contact with each other. Each of said shackles is split longitudinally or made up of a plurality of longitudinally-divided sections, and the two shackles are tied together and the sections of the respective shackles are held in assembled relationship, by a transversely-disposed tie member F that is removably mounted on reduced portions 2 at the inner ends of the shackles, as described in my pending application for patent Serial No. 577,528, filed November 27, 1931. Each shackle is provided with two integral extensions or side arms 3 that embrace one end of the removable tubular element B and which are provided with elongated slots 4 that receive the binding screw supporting member D that is associated with the shackle. The tie member F is held in assembled relationship with the shackles by a retaining bolt G screwed into the tie member and provided with an enlarged head G' that is arranged in overlapping relationship with portions of the two shackles or in overlapping relationship with an adapter H mounted on the bolt G and having a portion that laps over the shackles, as shown in Figure 1. Sufficient clearance is provided between the shackles and the portion of the adapter H that laps over the shackles to provide for the slight relative longitudinal movement or endwise movement of the shackles previously referred to. The tubes A are provided with external shoulders 5 and the shackles have annular portions 6 that surround the tubes and which are provided with shoulders 7 that are adapted to be drawn into tight engagement with the external shoulders 5 on the tubes when the binding screws C are tightened to force the tubular element B into contact with the tube ends or surfaces on which it seats.

By referring to Figure 1 it will be noted that the binding screws C are arranged in longitudinal alignment with the tubes A. In order to maintain this longitudinal alignment between the tubes and the binding screws C, I use contacting surfaces of the ball and socket type on the tubular element B and on the tube ends or other seats on which said tubular element bears, and I also use contacting surfaces of the ball and socket type between the tubular element B and the retaining means that is used to hold said tubular element in operative position. In the structure shown in Figure 1 the tubular element B is provided with convexed ends 15, and the ends of the tubes A are provided with concaved seats 7ª on which the ends 15 of the tubular element B bear, said co-acting surfaces 15 and 7ª being of such curvature that they will contact with each other in such a way as to produce tight joints between the element B and the tubes A when the binding screws are tightened, even though the tube ends are not in the same plane, or, in other words, are disposed so that one tube end projects slightly behind the other. The binding screws C, instead of acting directly on the tubular element B, as has heretofore been the usual practice in tube connecting devices of this general type, are arranged with their inner ends in engagement with a saddle I that bears upon the outer end of the tubular element B. Said tubular element B and said saddle I are provided with curved contact surfaces or bearing surfaces of such an arc that the tubular element B is capable of rocking or sliding relatively to the saddle I when said element B is adapting itself to the seats on which its ends 15 bear, without reducing the area of the contacting surfaces between said element B and saddle I, and without altering or destroying the longitudinal alignment between the tubes A and the binding screws C. In other words, if in the operation of tightening the binding screws C to force the tubular element B into contact with the tube ends or other surfaces on which it seats, it is necessary for said element B to rock or shift slightly in adapting itself to its co-acting seating surfaces, such shifting or rocking has absolutely no effect on the binding screws C used to retain the element B in position. Hence, in such a tube connecting device the binding screws C will always exert a thrust on the tubular element B in a direct line with the tubes A, with the result that absolutely tight joints in the structure are assured.

The elongated slots 4 constitute spaces in the outwardly extended portion of each shackle member E and E' increasing the elasticity of said portions that are at the sides of the slots in the respective shackle members, thus permitting the shackle members by the elasticity thereof under the influence of heat and variations in the degree of heat and the stress to which the shackle members are subjected when in use to compensate for variations in the temperature of the hot oil in the tubes A and tubular element B connecting and forming communication between said tubes. These slots 4 may be made of any desired length to obtain the required degree of elasticity to compensate for the variations mentioned and thereby prevent leakage at the joints between the tubes A and the tubular element B.

While I have herein illustrated my invention embodied in a connecting device for flanged or upset tubes, I wish it to understood that the invention is applicable to connecting devices for rolled or expanded tubes, it being immaterial so far as my broad idea is concerned, whether the tubular element B bears directly upon the ends of the tubes or upon seating surfaces on the housing which carries the retaining means for the tubular element B. The particular type or kind of housing is also immaterial, and while I prefer to have the binding screws act on a saddle that is provided with a concaved surface of relatively great area that bears upon a convexed surface on the removable tubular element B, any other suitable type of contacting surfaces of the ball and socket type may be used between the binding screws and the tubular element B without departing from the spirit of my invention.

Figure 2:
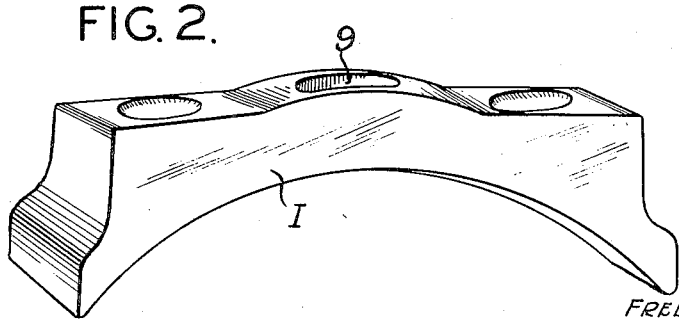
Figure 2 is a perspective view of the saddle.

In the form of my invention shown in Figures 1 and 2 the saddle I is held in assembled relationship with the tubular element B by a screw 8 in the top portion of the element B that is arranged in an elongated slot 9 formed in the central portion of the saddle, and the convexed surface of the tubular element B is provided with parallel ribs 10 that serve as a guideway for the saddle and hold the saddle and element B in longitudinal alignment with each other. However, any other suitable means may be used to combine the saddle I with the element B in such a way as to form a unit that can be removed preparatory to cleaning the tubes, without liability of the saddle becoming displaced or disassembled from the element B. For example, as shown in Figure 3, the tubular element B may be provided with integral ears 11 that project upwardly along the sides of the saddlle I and which are adapted to be bent downwardly over the top side of the saddle, after the saddle has been mounted on the element B, thereby securing the saddle to the element B in such a way that there is no liability of the saddle dropping off, when the element B is removed to permit the tubes to be cleaned.

Having thus described my invention, what I claim as new and desire to secure by Letters Patent is:

1. A tube connecting device provided with a removable tubular element for establishing communication between two tubes, binding screws arranged in longitudinal alignment with the tubes for holding said tubular element in operative position, means comprising a shiftable part on said tubular element engaged by said binding screws, for permitting said tubular element to assume various positions in adapting itself to the seats on which it acts, without altering or interfering with the longitudinal alignment between the binding screws and the tubes, and a device other than said binding screws holding said shiftable part in connection with said tubular element.

2. A tube connecting device, provided with a removable tubular element for establishing communication between two tubes, seats for the ends of said element, said ends and said seats being of the ball and socket type, thrust members arranged in longitudinal alignment with the tubes for holding said removable tubular element in position, and a part interposed between said tubular element and said thrust members, said element and part having contacting surfaces of such form that said tubular element is capable of assuming various positions in adapting itself to its seats without altering the longitudinal alignment between the tubes and said thrust members.

3. A tube connecting device, provided with a removable tubular element for establishing communication between two tubes, said element being provided at its outer side with a convexed surface, an adjustable means for exerting a longitudinal thrust on said tubular element, and a saddle interposed between said thrust means and said tubular element and provided with a concave surface that bears upon the convexed surface of said tubular element.

4. A tube connecting device, provided with a removable tubular element for establishing communication between two tubes, said element having a convexed surface, a saddle provided with an opposed concave surface, and binding screws disposed in longitudinal alignment with the tubes and arranged so as to exert a thrust on said saddle.

5. A tube connecting device, provided with a removable tubular element for establishing communication between two tubes, a housing mounted on the tubes, a retaining means carried by said housing for exerting a thrust on said tubular element so as to force it towards the tubes, seats on which the ends of said tubular element bear, said ends and said seats being of the ball and socket type, and a saddle interposed between said tubular element and said retaining means, constructed so as to permit said saddle to rock and assume various positions without changing the line of thrust of said retaining means on said tubular element.

6. A tube connecting device, provided with a removable tubular element for establishing communication between two tubes, external shoulders on the tubes, co-acting surfaces of the ball and socket type on the tube ends and on the ends of said tubular element, a housing mounted on the tubes and provided with surfaces that are adapted to engage the shoulders on the tubes, binding screws carried by the housing, and a saddle on which the binding screws act, provided with a concave surface that engages a convex surface on said tubular element.

7. A tube connecting device provided with a removable tubular element for establishing communication between two tubes, binding screws arranged in longitudinal alignment with the tubes, and a bearing member for the binding screws combined with said tubular element in such a way that said element is capable of turning relatively to said bearing member in adapting itself to its seats, without changing the line of thrust of the binding screws.

8. In a tube connecting device, the combination of two parallel tubes, an arc-shaped removable tubular element arranged transversely of said tubes for establishing communication between the same, a saddle engaging the convexed surface of said tubular element and arranged so as to be capable of shifting longitudinally of same, thrust devices that act on the end portions of said saddle, and means other than said thrust devices holding said saddle portion in position to be engaged by said thrust devices.

9. In a tube connecting device, an arc-shaped removable tubular element for establishing communication between two tubes, a shiftable saddle on the convexed surface of said tubular element mounted so as to be capable of moving longitudinally of said element, means for preventing said saddle and tubular element from becoming disassembled when said element is disengaged from the tubes, and a thrust means that acts on said saddle and holds said tubular member in operative relationship with the tubes.

10. Two parallel tubes, an arc-shaped tubular element establishing communication between adjacent ends of said tubes, housing parts having their inner ends attached to said tubes respectively, outwardly extended portions rigid with said housing parts and embracing the ends of said tubular element between them, binding screws mounted between said outwardly extended portions in approximate alinement with said tubes, and an adjustable abutment for said binding screws mounted on the outer side of said tubular element.

11. Two parallel tubes, a tubular element establishing communication between adjacent ends of said tubes, housing parts having their inner ends attached to said tubes respectively and extending outwardly at opposite sides of the end portions of said tubular element, an abutment member separate from said tubular element and seated against the outer surface thereof, and clamping devices engaged with the outer portions of said housing parts and having abutting engagement against said abutment member.

12. Two laterally spaced tubes, a tubular element establishing communication between said tubes, housing parts having their inner ends attached to said tubes respectively and having portions extending outwardly at opposite sides of the end portions of said tubular element, an abutment member separate from said tubular element and seated against the outer surface thereof, supporting members connected with the outer ends of said outwardly extended portions of said housing parts, and binding screws mounted in said supporting members and abutting against said abutment member.

13. Two laterally spaced tubes, a tubular element establishing communication between ends of said tubes, housing parts having their inner ends attached to said tubes respectively and having portions extending outwardly at opposite sides of and beyond said tubular element, an abutment member seated against the outer side of said tubular element for movement longitudinally to proper adjusted position for cooperation with said tubular element, means preventing sidewise movement of said abutment member, and binding devices supported by said outwardly extended portions of said housing parts engaging the abutment member and holding said tubular element in sealing engagement with said tubes.

14. Two laterally spaced tubes, a tubular element establishing communication between ends of said tubes, housing parts attached to said tubes and having portions extending outwardly at opposite sides of and beyond said tubular element, an abutment member seated against the outer surface of said tubular element, means for guiding said abutment member longitudinally to proper adjusted position on said tubular element and holding said abutment member from lateral displacement, and binding devices supported by said outwardly extended portions of said housing parts in approximately alinement with said tubes engaging said abutment member and holding said tubular element in sealing engagement with said tubes.

15. Two laterally spaced tubes, a tubular element having its open ends communicating with open ends of said tubes respectively, housing parts attached to said tubes and extending outwardly at opposite sides of and beyond said tubular element, an abutment member seated for longitudinal adjustment movements against the outer surface of said tubular element, means holding said abutment element from lateral displacement about said tubular element, and binding devices supported by said housing portions beyond said tubular element and engaging said abutment member and holding said tubular element in sealing engagement with said tubes.

FREDERICK E. KEY.